US011604631B2

(12) United States Patent
Wang

(10) Patent No.: US 11,604,631 B2
(45) Date of Patent: Mar. 14, 2023

(54) BLOCKCHAIN NODE SERVICE DEPLOYMENT METHOD, APPARATUS AND SYSTEM AND COMPUTING DEVICE AND MEDIUM

(71) Applicant: Alibaba Group Holding Limited, Grand Cayman (KY)

(72) Inventor: Yesong Wang, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/193,654

(22) Filed: Mar. 5, 2021

(65) Prior Publication Data

US 2021/0191702 A1   Jun. 24, 2021

Related U.S. Application Data

(63) Continuation of application No. PCT/CN2019/109268, filed on Sep. 30, 2019.

(51) Int. Cl.
*G06F 8/61* (2018.01)
*G06F 21/51* (2013.01)
*H04L 9/00* (2022.01)

(52) U.S. Cl.
CPC ............ *G06F 8/61* (2013.01); *G06F 21/51* (2013.01); *H04L 9/50* (2022.05); *G06F 2221/033* (2013.01)

(58) Field of Classification Search
CPC ...... G06F 8/60–61; G06F 21/51; G06F 21/64; G06F 2221/033; H04L 9/50
(Continued)

(56) References Cited

U.S. PATENT DOCUMENTS

| 10,652,239 B2 | 5/2020 | Jentzsch et al. |
| 10,725,744 B2 | 7/2020 | Li et al. |
| 10,762,079 B2 | 9/2020 | Shi et al. |
| 10,944,546 B2 | 3/2021 | Maino et al. |

(Continued)

FOREIGN PATENT DOCUMENTS

| CN | 106411901 A | 2/2017 |
| CN | 107659536 A | 2/2018 |

(Continued)

OTHER PUBLICATIONS

Gao, Weichao, et al., A Survey of Blockchain: Techniques, Applications, and Challenges, 27th International Conference on Computer Communication and Networks (ICCCN), 2018, 11 pages, [retrieved on Sep. 13, 2022], Retrieved from the Internet: <URL:http://ieeexplore.ieee.org/>.*

(Continued)

*Primary Examiner* — Geoffrey R St Leger
(74) *Attorney, Agent, or Firm* — Lee & Hayes, P.C.

(57) ABSTRACT

A method for deploying a blockchain node service includes in response to a blockchain node service deployment request from a user, sending the deployment request to a blockchain server to enable the blockchain server to deploy a node service on one or more blockchain nodes; configuring a trusted application corresponding to the blockchain nodes for a device associated with the user based on configuration information of the one or more blockchain nodes that is returned by the blockchain server; and sending the trusted application to enable an installation of the trusted application on the device. As such, by providing one-click deployment and operation and maintenance platform models, an one-click deployment service is provided to application service providers so that related parties can focus on the development of related applications, and the costs of con- (Continued)

figuring, deploying, and operating and maintaining basic blockchain-related services are reduced.

20 Claims, 7 Drawing Sheets

(58) Field of Classification Search
USPC .................................................. 717/174–178
See application file for complete search history.

(56) References Cited

U.S. PATENT DOCUMENTS

| | | | |
|---|---|---|---|
| 2018/0097779 A1 | 4/2018 | Karame et al. | |
| 2018/0254905 A1 | 9/2018 | Chun | |
| 2018/0268152 A1* | 9/2018 | Cuomo | ............... G06F 16/2255 |
| 2020/0175605 A1 | 6/2020 | Hu et al. | |

FOREIGN PATENT DOCUMENTS

| | | | |
|---|---|---|---|
| CN | 108512935 A | 9/2018 | |
| CN | 108540316 A | 9/2018 | |
| CN | 108965468 A | 12/2018 | |
| WO | WO2018059334 A1 | 4/2018 | |
| WO | WO-2019024674 A1 * | 2/2019 | ......... G06F 9/44521 |
| WO | WO-2019226042 A1 * | 11/2019 | ............. G06F 21/53 |
| WO | WO2021055546 A1 | 3/2021 | |

OTHER PUBLICATIONS

Samaniego, Mayra, et al., Blockchain as a Service for IoT: Cloud versus Fog, IEEE International Conf on Internet of Things, Green Computing and Communications, Cyber, Physical and Social Computing and IEEE Smart Data, 2016, 4 pages, [retrieved on Sep. 13, 2022], Retrieved from the Internet: <URL:http://ieeexplore.org/>.*

Samaniego, Mayra, et al., Hosting Virtual IoT Resources on Edge-Hosts with Blockchain, IEEE International Conference on Computer and Information Technology, 2016, 4 pages, [retrieved on Jun. 16, 2022], Retrieved from the Internet: <URL:http://ieeexplore.ieee.org/>.*

Samaniego, Mayra, et al., Internet of Smart Things—IoST: Using Blockchain and CLIPS to make Things Autonomous, IEEE 1st International Conference on Cognitive Computing, 2017, 8 pages, [retrieved on Jun. 16, 2022], Retrieved from the Internet: <URL:http://ieeexplore.ieee.org/>.*

Samaniego, Mayra, et al., Using Blockchain to push Software-Defined IoT Components onto Edge Hosts, BDAW '16: Proceedings of the International Conference on Big Data and Advanced Wireless Technologies, Nov. 2016, pp. 1-9, [retrieved on Jun. 16, 2022], Retrieved from the Internet: <URL:http://dl.acm.org/>.*

Translation of international Search Report dated Dec. 27, 2019, from corresponding PCT Application No. PCT/CN2019/109268, 2 pages.

Translation of Written Opinion dated Dec. 27, 2019, from corresponding PCT Application No. PCT/CN2019/109268, 4 pages.

* cited by examiner

BLOCKCHAIN NODE SERVICE DEPLOYMENT METHOD, APPARATUS AND SYSTEM AND COMPUTING DEVICE AND MEDIUM

CROSS REFERENCE TO RELATED PATENT APPLICATIONS

This application claims priority to and is a continuation of PCT Patent Application No. PCT/CN2019/109268 filed on 30 Sep. 2019, and is related to and claims priority to Chinese Application No. 201811189839.9, filed on 12 Oct. 2018 and entitled "Blockchain Node Service Deployment Method, Apparatus and System, and Computing Device and Medium," which are hereby incorporated by reference in their entirety.

TECHNICAL FIELD

The present disclosure relates to the field of Internet of Things technology and blockchain technology, and particularly to blockchain node service deployment methods, apparatuses, computing devices and storage media.

BACKGROUND

Blockchain is a new application mode of computer technologies such as distributed data storage, point-to-point transmission, consensus mechanism, and encryption algorithm, etc. The Internet of Things (IoT) is an information carrier such as the Internet and traditional telecommunications networks, and is a network that enables all ordinary objects capable of performing independent functions to be interconnected.

Although the development and application of the Internet of Things technology has achieved remarkable results in recent years, it also faces many problems and challenges. These problems may become a huge obstacle to the development and application of the Internet of Things in the future. Blockchain technology provides new possibilities for solving these problems.

However, in related application development and deployment scenarios of blockchain+Internet of Things that are currently known, application service providers need to deploy a number of blockchain service nodes to use blockchain services (such as BaaS, Blockchain as a Service), and then separately deploy blockchain-related node SDKs and configure related parameters on 1-N IoT devices. As such, IoT application service providers cannot focus on the development of related applications, and bring relatively higher costs of configurations, deployments, and operations and maintenance of blockchain-related basic services to the IoT application service providers.

Therefore, a need for an improved solution of blockchain node service deployment still exists.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

The purpose of the present disclosure is to provide solutions for deploying blockchain node services more conveniently, so as to reduce the costs of configurations, deployments, and operations and maintenance of blockchain-related basic services for application service providers.

According to the present disclosure a blockchain node service deployment method is provided, which includes: in response to a blockchain node service deployment request from a user, sending the deployment request to a blockchain server to enable the blockchain server to deploy a node service on one or more blockchain nodes; configuring a trusted application corresponding to the blockchain nodes for a device associated with the user based on configuration information of the one or more blockchain nodes that is returned by the blockchain server; and sending the trusted application to enable an installation of the trusted application on the device.

In implementations, the configuration information includes blockchain node address(es).

In implementations, the blockchain node service deployment request includes identification information of the device associated with the user and blockchain node configuration parameter(s).

In implementations, the blockchain node service deployment method may further include: receiving a service account registration request from the user and device information associated with the user; sending the service account registration request and the device information to a trusted service management server; and sending the service account registration request to the blockchain server.

In implementations, sending the trusted application includes sending identification information of the device and the trusted application to the trusted service management server, to enable the trusted service management server to install the trusted application on the device.

In implementations, the blockchain node service deployment method may be applied to the Internet of Things, and the device may be an Internet of Things device with a trusted security chip or module.

According to the present disclosure, a blockchain node service deployment method is also provided, and includes: deploying a node service on one or more blockchain nodes in response to a blockchain node service deployment request from a user; configuring a trusted application corresponding to the blockchain nodes for a device associated with the user based on configuration information of the one or more blockchain nodes; and sending the trusted application to a trusted service management server to enable the trusted service management server to install the trusted application onto the device.

In implementations, sending the trusted application may include sending identification information of the device and the trusted application to the trusted service management server, to enable the trusted service management server to install the trusted application onto the device.

In implementations, the blockchain node service deployment method may further include: receiving a service account registration request from the user and device information associated with the user to complete a service account registration of the user and binding of a related device; and sending the service account registration request and the device information to the trusted service management server.

In implementations, the blockchain node service deployment method may be applied to the Internet of Things, and the device may be an Internet of Things device with a trusted security chip or module.

According to the present disclosure, a blockchain node service deployment system is also provided, and includes: a blockchain management platform configured to respond to a blockchain node service deployment request from a user, send the deployment request to a blockchain server, configure a trusted application corresponding to the blockchain nodes for a device associated with the user based on configuration information of one or more blockchain nodes returned by the blockchain server, and send the trusted application to enable an installation of the trusted application on the device; the blockchain server configured to respond to the deployment request from the blockchain management platform, deploy a node service in the one or more blockchain nodes, and return the configuration information of the one or more blockchain nodes to the blockchain management platform.

In implementations, the blockchain node service deployment system may further include: a trusted service management server configured to remotely install the trusted application corresponding to the device on the device based on device identification information of the device associated with the user and the trusted application received from the blockchain management platform.

In implementations, the blockchain node service deployment system may also include: a trusted execution environment in the device, which is connected to the trusted service management server, and installs the trusted application corresponding to the device on the device in response to a remote installation operation from the trusted service management server.

In implementations, the blockchain management platform may further be configured to: receive a service account registration request from the user and device information associated with the user; send the service account registration request and the device information to the trusted service management server; and send the service account registration request to the blockchain server.

In implementations, the blockchain management platform sends the identification information of the device and the trusted application to the trusted service management server, to enable the trusted service management server to install the trusted application on the device.

In implementations, the blockchain node service deployment system is applied to the Internet of Things, and the device is an Internet of Things device with a trusted security chip or module.

According to the present disclosure, a blockchain node service deployment apparatus is also provided, and includes: a request sending unit configured to send a blockchain node service deployment request to a blockchain server in response to the deployment request from a user, to enable the blockchain server to deploy a node service on one or more blockchain nodes; an application configuration unit configured to configure a trusted application corresponding to the blockchain nodes for a device associated with the user based on configuration information of the one or more blockchain nodes that is returned by the blockchain server; and a first sending unit configured to send the trusted application to enable an installation of the trusted application on the device.

In implementations, the blockchain node service deployment apparatus may further include: a registration unit configured to receive a service account registration request and device information associated with the user from the user; and a second sending unit configured to send the service account registration request and the device information to a trusted service management server; and a third sending unit configured to send the service account registration request to the blockchain server.

In implementations, the first sending unit sends identification information of the device and the trusted application to the trusted service management server, to enable the trusted service management server to install the trusted application onto the device.

According to the present disclosure, a computing device is also provided, and includes: a processor; and a memory storing executable codes, the executable codes when executed by the processor, causing the processor to perform the method as described above.

According to the present disclosure, a non-transitory machine-readable storage medium having executable codes stored thereon is also provided, and the executable codes, when executed by a processor of an electronic device, cause the processor to perform the method described above.

The present disclosure provides one-click deployment services for application service providers by providing one-click deployment and operation and maintenance platform models, so that related parties can focus on the development of related applications, and the costs of configuring, deploying, and operating and maintaining basic blockchain-related services are reduced.

BRIEF DESCRIPTION OF THE DRAWINGS

Through a more detailed description of exemplary embodiments of the present disclosure in conjunction with accompanying drawings, the above and other objectives, features and advantages of the present disclosure will become more apparent. In the exemplary embodiments of the present disclosure, the same reference numerals generally represent the same components.

DETAILED DESCRIPTION

Figure 1:
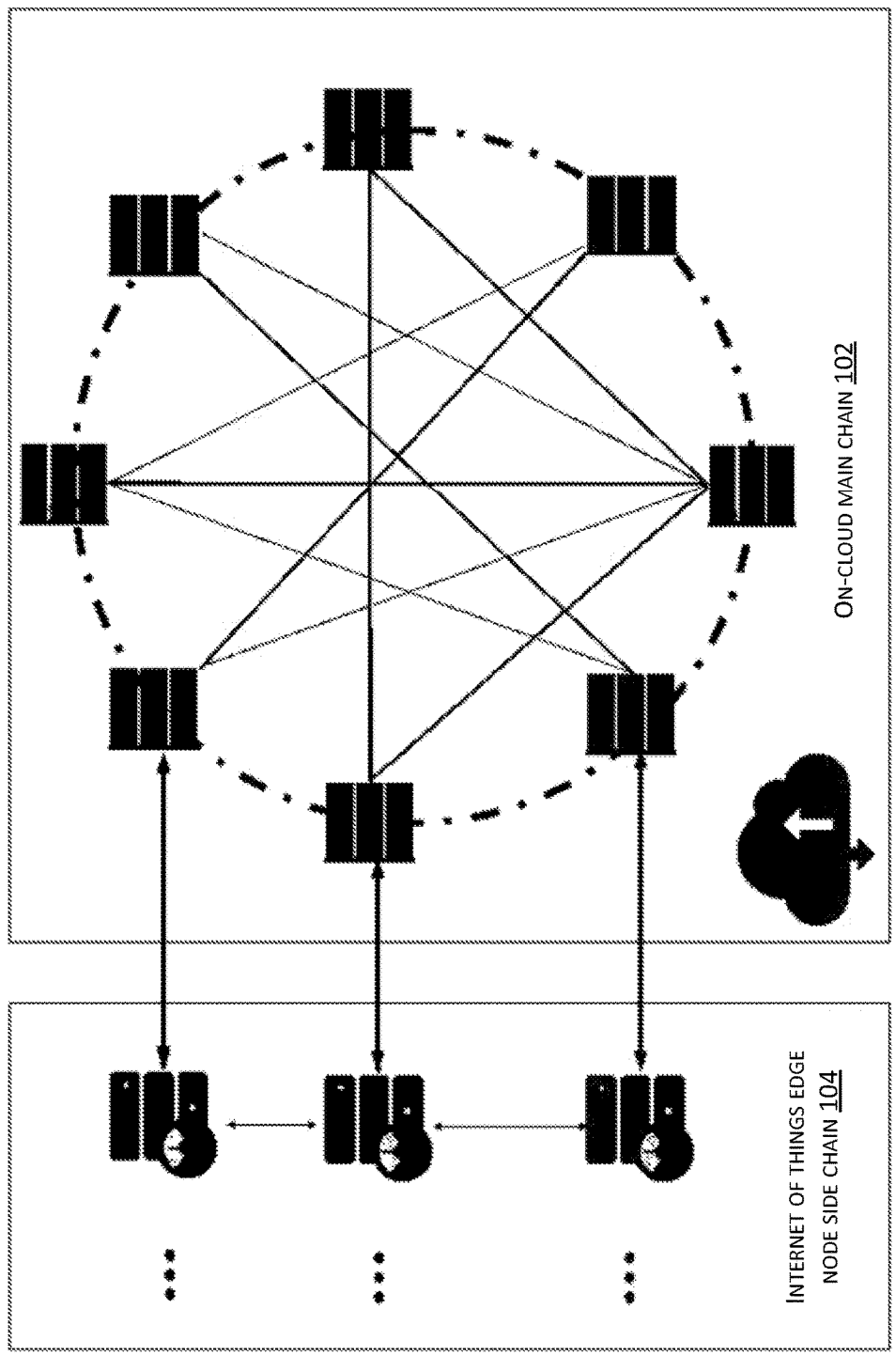
FIG. 1 shows a schematic diagram of a distributed ledger technology network topology according to the embodiments of the present disclosure.

Exemplary embodiments of the present disclosure are described in more detail hereinafter with reference to the accompanying drawings. Although the exemplary embodiments of the present disclosure are shown in the drawings, it should be understood that the present disclosure can be implemented in various forms and should not be limited by the embodiments set forth herein. On the contrary, these embodiments are provided to make the present disclosure more thorough and complete, and to fully convey the scope of the present disclosure to one skilled in the art.

TERM EXPLANATION

Blockchain is essentially a distributed ledger technology shared by multiple parties, which realizes the immutability of transaction data and historical records through mathematical methods, and realizes common confirmation of transactions and ledger records by all participants through consensus algorithms and smart contracts. Blockchains are divided into three basic types: public chains, alliance chains, and private chains.

A blockchain service: (Blockchain as a Service, BaaS) refers to the use of data generated by a blockchain to provide a series of operational services, such as blockchain-based search queries and task submission, etc. A blockchain service of the present disclosure is an enterprise-level PaaS (Platform as a Service) platform service based on a mainstream blockchain technology, which helps users to quickly build a more stable and secure production-level blockchain environment, reduce challenges in aspects, such as deployment, operation and maintenance, management, and application development, etc., enable the users to focus more on innovation of core services and achieve rapid chaining of services.

Distributed ledger Technology (DLT) is a database that is shared, replicated, and synchronized among network members. A distributed ledger records transactions between network participants, such as an exchange of assets or data. This type of shared ledger reduces the time and expense costs caused by reconciling different ledgers.

A distributed network node (DLT node) is formed by interconnections of node machines that are distributed in different locations and have multiple terminals. Any point in a network is connected to at least two lines. When any one of the lines fails, the communication can be completed through other link(s), thus having high reliability. At the same time, the network is easy to expand.

Edge computing refers to an open platform that integrates core capabilities of networking, computing, storage, and application on the sides close to sources of things or data, and provides the nearest services that are nearby. Its applications are initiated on the edge, resulting in faster network service responses and meeting the industry's basic needs in aspects, such as real-time services, application intelligence, security and privacy protection, etc. Edge computing is between physical entities and industrial connections, or at the top of physical entities. Cloud computing can still access historical data of edge computing.

Cloud computing is a model of adding, using, and delivering Internet-based related services, which usually involves a provision of dynamic, easily scalable and often virtualized resources through the Internet.

A blockchain of Things (BoT) management platform is a blockchain network management platform of cloud+edge devices launched by cloud service providers for upper-level application service providers of the Internet of Things+ blockchain, and aims to help building two-way blockchain node data communication networks between a device terminal and a cloud end, and between device terminals.

A blockchain server (such as a BaaS cloud platform) is an enterprise-level PaaS (Platform as a Service) platform service based on the mainstream blockchain technology, which can help users quickly build a more stable and secure blockchain environment, reduce challenges in aspects, such as blockchain deployment, operation and maintenance, management, and application development, etc., and enable users to focus more on innovation of core services and achieve rapid chaining of services, where the users refer to Internet of Things application service providers or Internet of Things device users.

A Trusted Service Manager (TSM) server is a trusted service management platform for remote chip management and application distribution of devices with security chips, such as SE, and by providing one-stop service, provides users with end-to-end security solutions, which include life cycle management of security carriers, distribution of applications, deposits of keys, statistical analysis, etc. This trusted service platform complies with GP international standards, supports multiple types of modes, multiple types of security carriers, and standard interfaces to ensure rapid deployments and implementations. Moreover, it can combine the powerful cloud computing capabilities of service providers to ensure high performance, high security, scalability, high availability, and relatively low cost of service systems.

A Trusted Execution Environment (TEE) is a secure area on a main processor of an Internet of Things device, which can ensure the security, confidentiality and integrity of codes and data stored in the secure area. A carrier of the trusted execution environment may be, for example, a trusted root RoT security chip (Secure Element, SIM, TEE, etc.) or module (Secure MCU) on the device.

A Trusted Application (TA), is a trustable application that has passed a trusted authentication service. In the present disclosure, blockchain nodes deployed in a cloud end can provide blockchain services for trusted applications on device ends. Moreover, in the embodiments of the present disclosure, a trusted application is installed in a trusted security chip or module on a device.

A device identifier is an identity identification of an IoT device, and can uniquely identify the IoT device in the IoT.

[Solution Overview]

The present disclosure proposes a distributed ledger technology network topology for scenarios where a blockchain server+device deployment is needed. This distributed network topology can be applied to any form of blockchain technology, including private chains, public chains, and/or alliance chains. The present disclosure will use a form of an alliance chain as an example for detailed description.

It should be understood that the distributed ledger technology network topology can be applied to any field or scenario that requires a blockchain server+device deployment, such as the field of Internet of Things, commodity tracing, supply chain finance, charity, mutual insurance, and other scenes.

To facilitate description and understanding, the drawings and the embodiments that are shown in the present disclosure are described in conjunction with a deployment of blockchain node services used in the field of the Internet of Things. For example, a cloud end (or on a cloud) involved hereinafter is a cloud service end of related blockchain services for the field of the Internet of Things, and a device end under the cloud may be a device end including an IoT device with a trusted security chip or module. The IoT device may include, but is not limited to, a mobile phone, a wearable device, a smart door lock, a gateway device, a vehicle-mounted device, etc.

FIG. 1 shows a schematic diagram of a distributed ledger technology network topology 100 according to the embodiments of the present disclosure. It should be understood that the network topology is a schematic diagram of a blockchain network topology after a deployment of an on-cloud server end+an under-cloud device end blockchain node service deployment of the present disclosure, and does not impose any specific limitations on the distributed ledger technology network topology of the present disclosure.

As shown in FIG. 1, the distributed ledger technology network topology 100 may include an on-cloud main chain 102 deployed in the cloud end, and a side chain 104 of Internet of Things edge nodes deployed on the under-cloud device end.

For each Internet of Things application service provider (such as enterprises, organizations, etc.), when it wants to join a certain alliance blockchain of the Internet of Things (referred to as an alliance chain), one or more blockchain nodes are deployed in the cloud end to enable it as a participant of a main blockchain alliance chain. The one or more blockchain nodes deployed in the cloud end form the main chain 102 on the cloud as shown on the right side of FIG. 1, so as to rely on the computing power and data storage capability of the main chain to perform blockchain-related operations and provide related blockchain services for many application service providers.

At the same time, due to factors such as cost, data privacy, and real-time edge computing, it is necessary to deploy blockchain node services on related edge computing devices (device side under the cloud), such as a chain side 104 of an IoT edge node as shown on the left side of FIG. 1. A blockchain node on an edge device can be connected with one or more main chain nodes on the cloud according to service needs to complete relevant collaborative operations of the blockchain.

[Blockchain Node Service Deployment System]

A formation of the above-mentioned network topology can be realized by the blockchain node service deployment system of the present disclosure.

Figure 2:
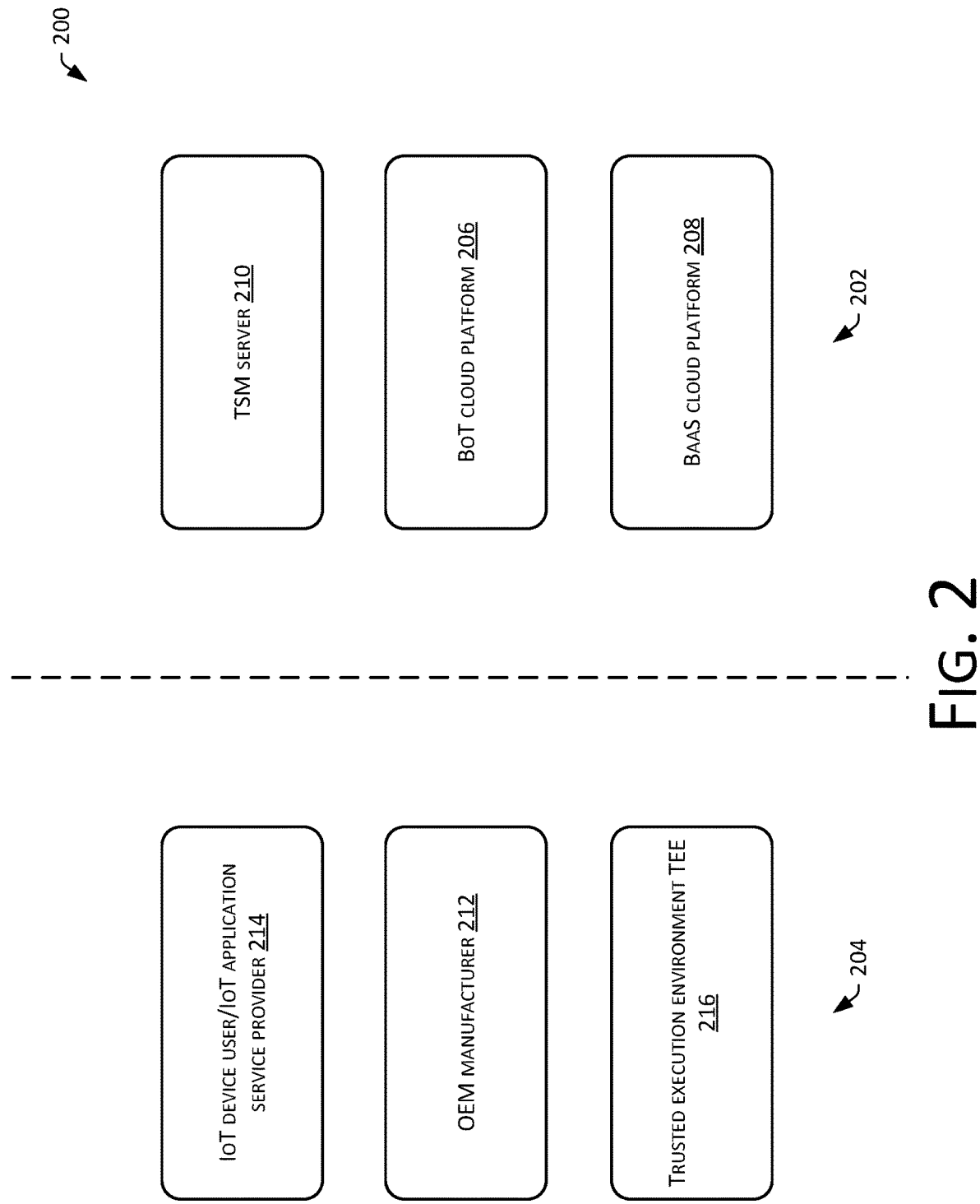
FIG. 2 shows a schematic block diagram of a blockchain node service deployment system according to the embodiments of the present disclosure.

FIG. 2 shows a schematic block diagram of a blockchain node service deployment system 200 (deployment system for short) according to the embodiments of the present disclosure.

As shown in FIG. 2, the blockchain node service deployment system 200 of the present disclosure may include two ends, namely a cloud end 202 (on a cloud) and an IoT device end 204 (under the cloud).

The cloud end 202 (on the cloud) can include a blockchain management platform 206 (or referred to as a BoT cloud platform 206 in FIG. 2), a blockchain server 208 (or referred to as a BaaS cloud platform 208 in FIG. 2), and a TSM server 210.

When applied to the field of Internet of Things technology, the blockchain management platform can be called an Blockchain of Things (BoT) management platform (referred to as a BoT cloud platform in the following description), which is a blockchain network management platform of on cloud+edge device launched by a cloud service provider for an upper-level application service provider of the Internet of Things+blockchain, and is designed to help building two-way blockchain node data communications between a device terminal and the cloud end, between device terminals. The BoT management platform can provide device-end SDKs, allowing IoT devices to easily access system services.

The blockchain server, for example, can be a blockchain (Blockchain as a Service, BaaS) cloud platform (referred to as a BaaS cloud platform in the following description), which is an enterprise-level PaaS (Platform as a Service) platform service based on mainstream blockchain technology, and can help users quickly build a more stable and secure blockchain environment reduce challenges in aspects, such as blockchain deployment, operation and maintenance, management, application development, etc., and enable the users to focus more on core service innovation and to achieve fast chaining of services. The users refer to Internet of Things application service providers or Internet of Things device users.

As an example of the present disclosure, the BoT cloud platform can send a deployment request to the BaaS cloud platform in response to a blockchain node service deployment request from a user, configure a trusted application corresponding to the (on-cloud) blockchain node for a device associated with the user based on configuration information of one or more (on-cloud) blockchain nodes returned by the BaaS cloud platform, and send the trusted application to facilitate an installation of the trusted application on the device.

The BaaS cloud platform can respond to the cloud deployment request from the blockchain cloud platform, deploy node services on the one or more (on-cloud) blockchain nodes in the cloud end, and return configuration information of the one or more blockchain nodes on the cloud to the blockchain cloud platform.

The Trusted Service Manager (TSM) server is a trusted service platform for remote chip management and application distribution for devices with SE security chips, and provides users with end-to-end security solutions, including security carrier life cycle management, application distribution, key escrow, statistical analysis, etc., by providing one-stop services. This trusted service platform complies with GP international standards, supports multiple types of modes, multiple types of security carriers, and standard interfaces to ensure rapid deployments and implementations. Moreover, it can combine the powerful cloud computing capabilities of service providers to ensure the high performance, high security, scalability, high availability, and low cost of service systems.

The BoT cloud platform sends the TA to the TSM server, and also sends a device ID of the device, so that the TSM server can implement services, such as trusted application distribution and remote installation for the device based on the device ID and configuration information corresponding to the device.

The TSM server may remotely install a trusted application corresponding to the device on the device based on the device identification information of the device associated with the user and the received trusted application from the blockchain cloud platform. Specifically, the TSM server installs a trusted application corresponding to the device in a secure element (for example, SE, SIM, eSIM, TEE, Secure MCU, etc., as described above) on the device.

The device under the cloud may include a related device terminal (for example, an IoT device).

Since objects that use the device terminal, i.e., operating entities, are different at different stages, the device terminal under the cloud can also be demarcated more specifically based on corresponding related use parties, for example, an original manufacturer of the IoT device (i.e., OEM) 212, an IoT device user/IoT application service provider 214, and a trusted execution environment TEE 216 in the IoT device. A carrier of the trusted execution environment TEE 216 is a related device security chip on the device terminal, such as an SE security chip.

The original manufacturer of the IoT device, i.e., the OEM 212, acting as the original manufacturer of the related device, realizes an initial production of the related device, such as assigning a device identification ID and a device secret key ID to the device, writing and recording related information in the device TEE, and registering related information of the device to the TSM server, etc.

The IoT device user/IoT application service provider 214, acting as the user, can register a SP account provided by the service provider and enjoy related services based on this SP account.

The trusted execution environment TEE 216 in the device can be connected to the TSM server, and install a trusted application TA on the device (the secure element) corresponding to the device in response to a remote installation operation from the trusted service management server.

Using the above-mentioned blockchain node service deployment system of the present disclosure, it is possible to provide users with one-click on-cloud+under-cloud deployment services, so that the users can focus on the development of related applications, and reduce the costs of configuration, deployment, and operation and maintenance of blockchain-related basic services to improve user experience.

As mentioned earlier, the user needs to register for a relevant SP account to enjoy relevant services of a service provider. Therefore, before deploying relevant blockchain node services for users, the aforementioned BoT cloud platform can also provide the users with service account registration and device binding services.

In a registration phase, the BoT cloud platform receives a service account registration request (including user account registration information) and device information associated with a user from the user, completes the user service account, and binds the user service account with the user device. After that, the BoT cloud platform sends the service account registration request and the device information to the trusted service management server, and sends the service account registration request to the BaaS cloud platform.

Therefore, in the mentioned registration stage, the user only needs to fill in registration information once, and the user service account registration can be completed by the BoT cloud platform, and the user registration information and device binding information can be stored synchronously in the cloud end.

It should be understood that FIG. 2 only provides a brief introduction of the main components of the blockchain node service deployment system of the present disclosure. The present disclosure does not impose any and other limitations on relationships between various parts of the deployment system and specific functions implemented by each part thereof. The manufacturing schemes of related devices involved therein can refer to existing related technologies, which are not repeated herein in the present disclosure. The deployment of the blockchain node services realized by the deployment system can be seen in the following drawings and description of the embodiments, which are not repeated herein.

[Blockchain Node Service Deployment Process]

Figure 3:
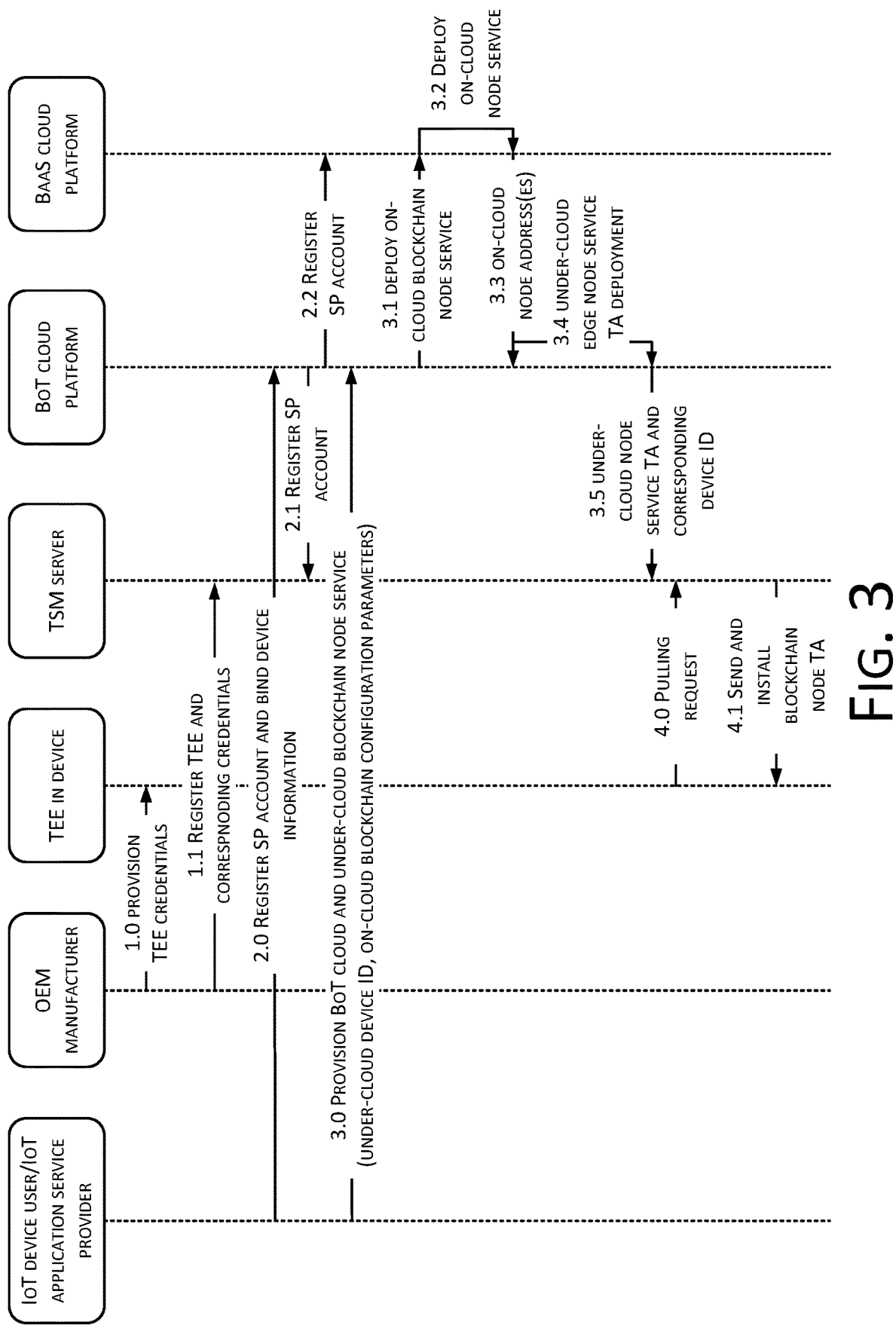
FIG. 3 shows a schematic diagram of a process of deploying a blockchain node service according to the embodiments of the present disclosure.

FIG. 3 shows a schematic diagram of a process of deploying a blockchain node service according to the embodiments of the present disclosure.

As shown in FIG. 3, based on the parts specifically involved in the on-cloud and under-cloud of the deployment system as shown in FIG. 2, the process of deploying a blockchain node service can be divided into three parts, namely an IoT device manufacturing part, a SP account registration part and a blockchain node service deployment part. The process of deploying the blockchain node service in the present embodiment will be described in detail hereinafter in conjunction with the flowchart shown in FIG. 3.

IoT Device Manufacturing

Referring to the flowchart as shown in FIG. 3, when an original manufacturer of Internet of Things (IoT) devices, i.e., OEM, is producing an IoT device with a Trusted Execution Environment (TEE):

At step 1.0, related system applications and confidential data are burned and recorded into a TEE in a device, i.e., providing TEE certificates (Provision TEE Credentials);

At step 1.1, the OEM uploads related identification ID and keys (including a public key and a private key) ID and other information of the TEE of the IoT device to a trusted service management server (or third-party trusted service management server) at the back end to allow a device registration of the successfully burned IoT device at the trusted service management server. The trusted service management server needs to be associated and linked with cloud platforms (such as a BoT cloud platform and a BaaS cloud platform).

SP Account Registration

Each IoT application service provider/IoT device user (i.e., user) can first register with an SP account after purchasing and deploying a related IoT device. The SP account is a service account provided by a service provider (SP) for a user, and the user can enjoy various types of services provided by the service provider based on this SP account.

Specifically, at step 2.0, a user registers an SP account on a BoT (Blockchain As Things) cloud platform, and uploads device identification (ID) information related to a purchased IoT device, so that the SP account corresponding to the user can be registered with the BoT cloud platform, and realize a binding of the SP account and the user's device.

Thereafter, at step 2.1, the BoT cloud platform connects with the trusted service management server, and sends a related SP account registration request and bound device ID information thereto.

At step 2.2, the BoT cloud platform sends the related SP account registration request and the bound device ID information to the BaaS cloud platform at the back end.

Therefore, through the BoT cloud platform of the present disclosure, each user only needs to perform an account registration and a device binding request once, and the user's account information and bound device information can be stored in the cloud end in one step, which greatly simplifies the process of user's service account registration and device binding, and brings great convenience to the user.

Blockchain Node Service Deployment

When an IoT application service provider/IoT device user (i.e., user) has a need for blockchain on-cloud+under-cloud deployment in an IoT:

At step 3.0, the user sends a blockchain node service deployment request on a BoT cloud platform, requesting a creation of on-cloud (N number of blockchain node services) and under-cloud (blockchain node services on N number of IoT devices).

The user only needs to provide necessary information to build an on-cloud+under-cloud blockchain environment on the BoT cloud platform. The necessary information may include, for example, an IoT device ID, blockchain node configuration parameters (for example, an alliance name, an alliance domain name, a region, a specification, organization information, etc.), etc. The above information is not completely the same for different service providers, and can be specifically determined according to a service provider and an actual application scenario, which is not limited in the present disclosure.

Afterwards, in step 3.1, the BoT cloud platform sends a cloud deployment request to the blockchain service (BaaS) cloud platform, requesting a deployment of node services (for example, N in the present embodiment) on one or more on-cloud blockchain nodes in a cloud end. The request includes the necessary information to build a blockchain environment on the cloud, and a service provider can configure necessary configuration parameters that are required in the request according to the need, which is not limited by the present disclosure.

At step 3.2, in response to the cloud deployment request, the BaaS cloud platform creates, deploys, and runs node services on one or more related on-cloud blockchain nodes in the cloud end. At step 3.3, the BaaS cloud platform then returns relevant information to the BoT cloud platform, such as addresses of the on-cloud blockchain nodes, a creation node (the earliest blockchain node that is constructed), and other related configuration parameters.

At step 3.4, based on the related configuration information of the on-cloud blockchain node services that have been successfully and completely deployed and the related device information, the BoT cloud platform configures a trusted application (TA) corresponding to the on-cloud blockchain node for the device associated with the user on the device end. The related configuration information of the on-cloud blockchain node services may include an address of an on-cloud blockchain node.

At step 3.5, the BoT cloud platform sends the trusted application (TA) and the IoT device ID information corresponding to the trusted application to the TSM server.

At step 4.0, the IoT device connects to the TSM server.

At step 4.1, the TSM server remotely installs the trusted application (TA) corresponding to the device on a secure element of the corresponding IoT device based on the device ID information, application configuration information, and other parameters.

So far, for scenarios where there is a need for a rapid deployment of a blockchain server end+device end, after a user sends a blockchain node service deployment request, a server end+device end blockchain service deployment is completed through one click, which is greatly simplified the user's operation process.

Therefore, through the above-mentioned process of blockchain node service deployment of the present disclosure, it is possible to help IoT application service providers to quickly create and deploy a blockchain environment with one click, and simplify a process of deployment and an application configuration of blockchain services.

The blockchain node service deployment solutions for the Internet of Things of the present disclosure can combine security vertical technical capabilities of conventional Internet of Things devices and horizontal general service technologies on a cloud. With a premise of making no changes to the existing related technology stack, end-to-end trusted service management capabilities that are based on IoT security chips and TEE, and cloud-end one-stop BaaS technical capabilities' on-cloud (main blockchain computing and storage service platform)+under-cloud (edge computing service platform) are combined, providing an end-to-end secure, one-stop deployment, operation and maintenance platform model that cut in from the cloud end for basic blockchain services combining IoT edge computing and cloud computing, and deeply integrates IoT technology with blockchain technology to enable IoT application service providers can focus on the development of related applications, reduce the costs of configuring, deploying, and operating and maintaining blockchain-related basic services, and realize an one-click construction of a blockchain environment, so that users can quickly develop blockchain service innovation.

[Blockchain Node Service Deployment Method]

The above-mentioned process of blockchain node service deployment of the present disclosure can be implemented as a blockchain node service deployment method.

Figure 4:
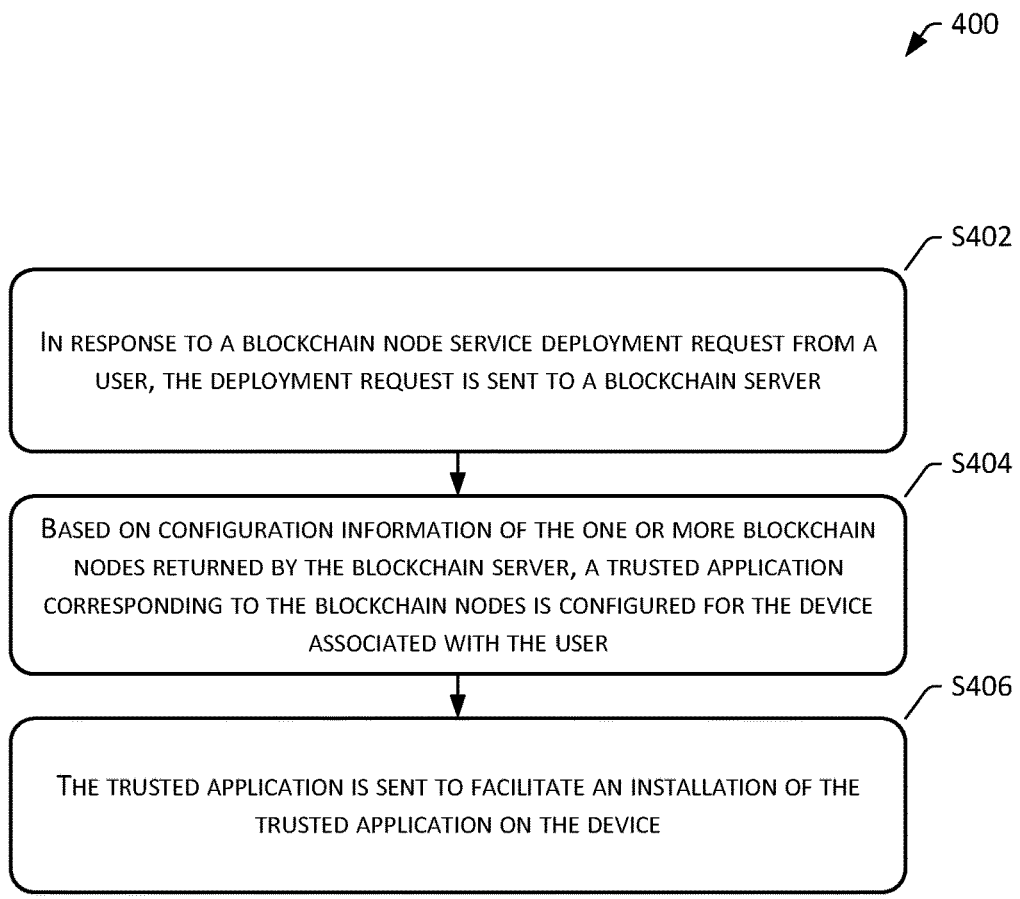
FIG. 4 shows a schematic flowchart of a method for deploying a blockchain node service according to the embodiments of the present disclosure.

FIG. 4 shows a schematic flowchart of a blockchain node service deployment method 400 according to the embodiments of the present disclosure. The blockchain node service deployment method can be applied to the Internet of Things, and can be executed by a blockchain management platform side. The devices described below can be Internet of Things devices with trusted security chips or modules.

As shown in FIG. 4, at step S402, in response to a blockchain node service deployment request from a user, the deployment request is sent to a blockchain server, to enable the blockchain server to deploy a node service on one or more blockchain nodes.

The blockchain node service deployment request includes identification information of a device associated with the user and blockchain node configuration parameters. The identification information of the device may be, for example, an identity identification of an Internet of Things device, which can uniquely identify the Internet of Things device in the Internet of Things. The blockchain node configuration parameters the may include, for example, a number of blockchain nodes that need to be configured or other related configuration parameters.

At step S404, based on configuration information of the one or more blockchain nodes returned by the blockchain server, a trusted application corresponding to the blockchain nodes is configured for the device associated with the user. The configuration information of the blockchain nodes may include addresses of the blockchain nodes.

At step S406, the trusted application is sent to facilitate an installation of the trusted application on the device. Specifically, the identification information of the device and the trusted application may be sent to the trusted service management server, to enable the trusted service management server to install the trusted application on the device.

As an example of the present disclosure, the above method may also include a user service account registration process, i.e., receiving a service account registration request and device information associated with a user from the user; sending the service account registration request and the device information to a trusted service management server; and sending the service account registration request to a blockchain server.

In the above-mentioned registration stage, the user only needs to fill in registration information once, and the user service account registration can be completed by the blockchain management platform, and the user registration information and device binding information can be stored synchronously in the cloud end.

Figure 5:
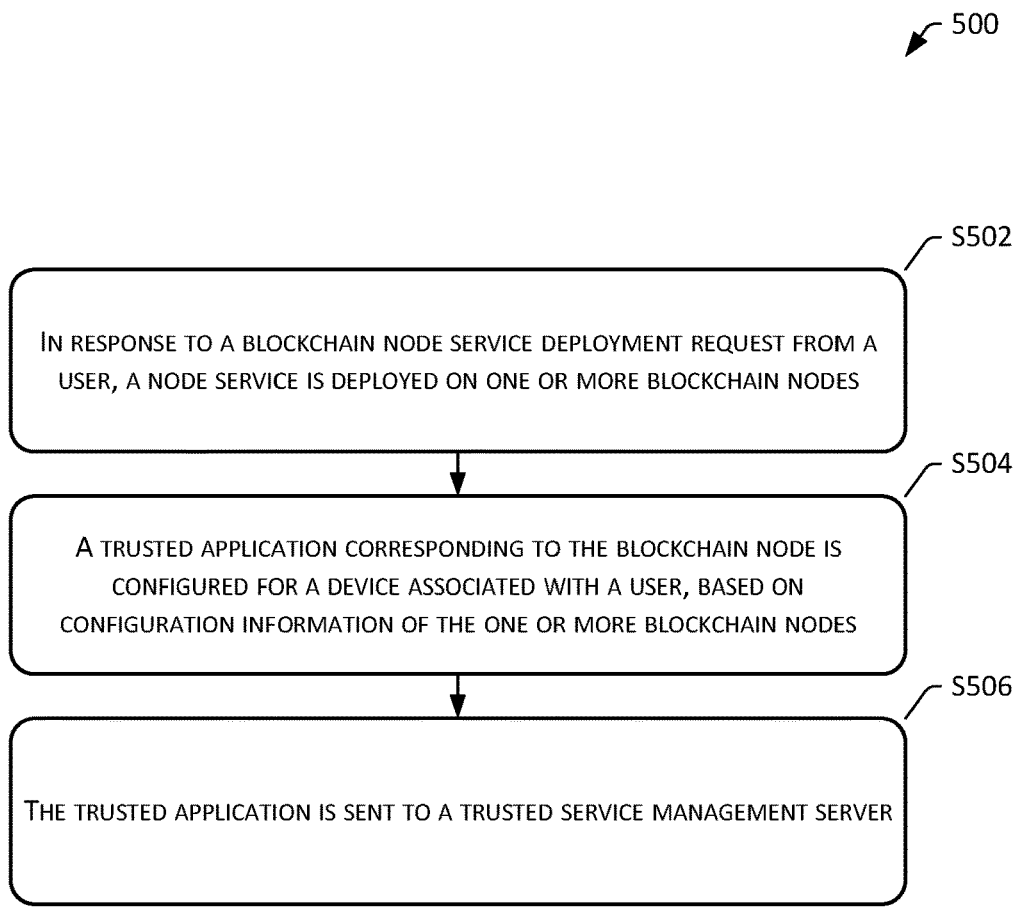
FIG. 5 shows a schematic flowchart of a method for deploying a blockchain node service according to the embodiments of the present disclosure.

FIG. 5 shows a schematic flowchart of a blockchain node service deployment method 500 according to the embodiments of the present disclosure. The blockchain node service deployment method can be applied to the Internet of Things, and can be executed by the deployment system as shown in FIG. 2, and the device described below can be an Internet of Things device with a trusted security chip or module.

As shown in FIG. 5, at step S502, in response to a blockchain node service deployment request from a user, a node service is deployed on one or more blockchain nodes.

At step S504, a trusted application corresponding to the blockchain node is configured for a device associated with a user, based on configuration information of the one or more blockchain nodes.

At step S506, the trusted application is sent to a trusted service management server, so that the trusted service management server installs the trusted application on the device. Identification information of the device and the trusted application may be sent to the trusted service management server, so that the trusted service management server installs the trusted application on the device.

As an example of the present disclosure, the above method may also include a user service account registration process, i.e., receiving a service account registration request and information of a device associated with a user from the user to complete the user's service account registration and a binding of the associated device, and sending the service account registration request and the information of the device to a trusted service management server.

In the above-mentioned registration stage, the user only needs to fill in registration information once, and the user's service account registration can be completed by a blockchain management platform, and the user's registration information and device binding information can be stored synchronously in a cloud end.

So far, the methods for deploying blockchain node services of the present disclosure have been briefly illustrated in conjunction with the method flowcharts shown in FIGS. 4 to 5. Details of implementation processes of the deployment methods can be referenced to the relevant description of the present disclosure as described above.

[Blockchain Node Service Deployment Apparatus]

Figure 6:
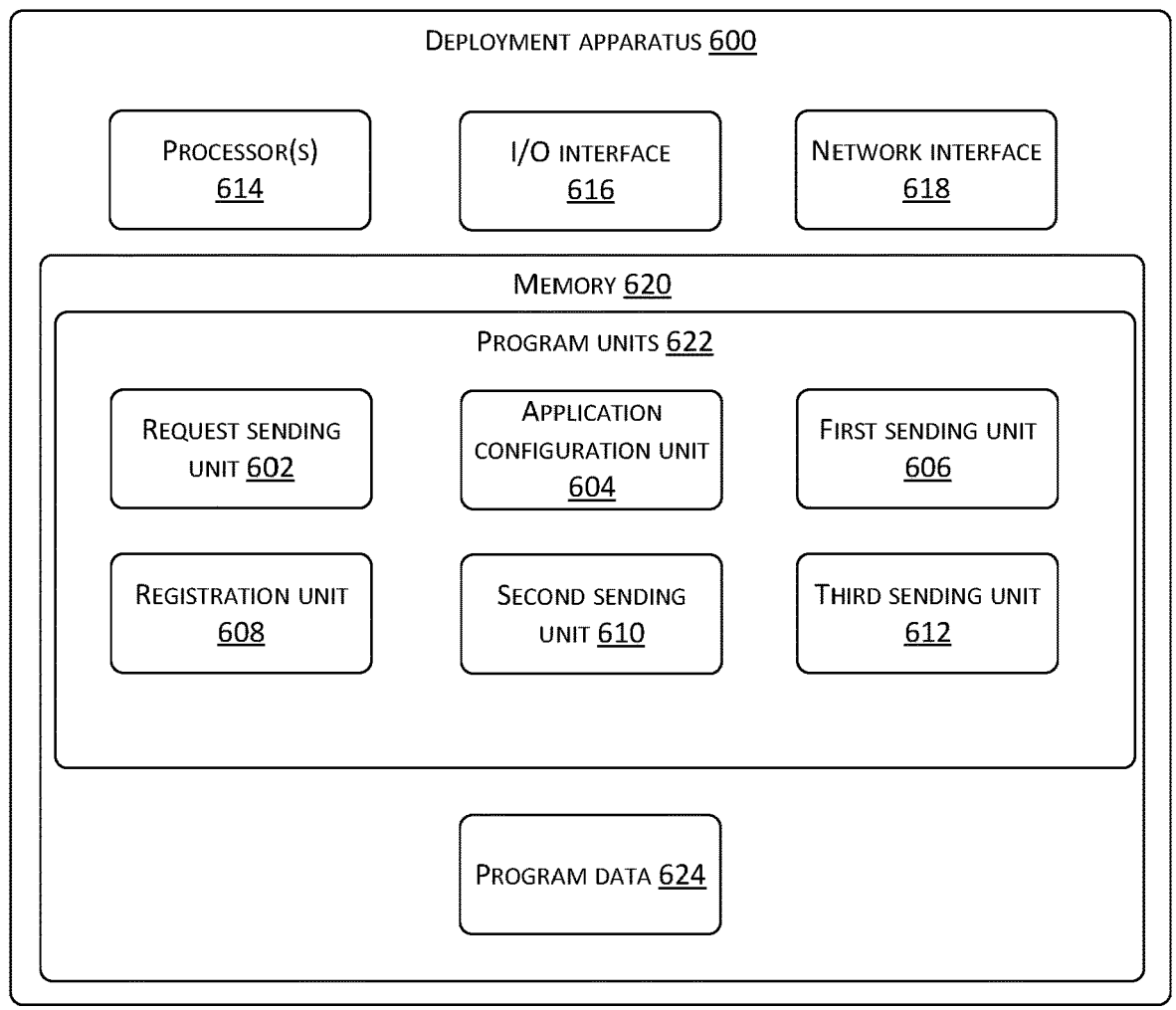
FIG. 6 shows a schematic block diagram of a structure of an apparatus for deploying a blockchain node service according to the embodiments of the present disclosure.

FIG. 6 shows a schematic block diagram of a structure of a blockchain node service deployment apparatus 600 (a deployment apparatus for short) according to the embodiments of the present disclosure. Functional modules of the deployment apparatus 600 can be implemented by hardware, software, or a combination of hardware and software that implements the principles of the present disclosure. One skilled in the art can understand that the functional modules described in FIG. 6 can be combined or demarcated into sub-modules to realize the principles of the above-mentioned disclosure. Therefore, the description herein may support any possible combinations, or demarcations, or further limitations of the functional modules described herein.

The following briefly describes the functional modules that the deployment apparatus can have and the operations that can be performed by each functional module. For the details involved, refer to the above related descriptions, which will not be repeated herein.

As shown in FIG. 6, the blockchain node service deployment apparatus 600 (deployment apparatus for short) of the present disclosure may include a request sending unit 602, an application configuration unit 604, and a first sending unit 606. The deployment apparatus may be set in a cloud end and applied to the Internet of Things. A device described below may be an Internet of Things device with a trusted security chip or module.

The request sending unit 602 may be configured to send a blockchain node cloud deployment request to a blockchain server in response to the service deployment request from a user, so that the blockchain server deploys a node service on one or more blockchain nodes. The blockchain node service deployment request may include identification information of a device associated with the user and blockchain node configuration parameters. The blockchain node configuration parameter may be, for example, the number of blockchain nodes that need to be configured or other related configuration parameters.

The application configuration unit 604 may be configured to configure a trusted application corresponding to the blockchain nodes for the device associated with the user based on configuration information of the one or more blockchain nodes returned by the blockchain server. The configuration information may include addresses of the blockchain nodes.

The first sending unit 606 may be configured to send the trusted application to enable an installation of the trusted application on the device. The first sending unit 630 may send the identification information of the device and the trusted application to a trusted service management server, so that the trusted service management server can install the trusted application on the device.

In implementations, the deployment apparatus 600 of the present disclosure may further include a registration unit 608, a second sending unit 610, and a third sending unit 612 that enable the user to register a service account.

Specifically, the registration unit 608 may be configured to receive a service account registration request from the user and device information associated with the user. The second sending unit 610 sends the service account registration request and the device information to the trusted service management server. The third sending unit 612 is configured to send the service account registration request to a BaaS cloud platform.

In implementations, the deployment apparatus 600 may further include one or more processors 614, an input/output interface 616, a network interface 618, and memory 620.

The memory 620 may include a form of computer readable media such as a volatile memory, a random access memory (RAM) and/or a non-volatile memory, for example, a read-only memory (ROM) or a flash RAM. The memory 620 is example of a computer readable media. The memory 620 may include one or more program units 622 and program data 624.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should be understood that "first", "second", and "third" in the present disclosure are only intended to distinguish the sending units that are involved, and are not intended to limit their functions or sequences. In implementations, the second sending unit and the third sending unit may be reused here, and the present disclosure does not limit an order of execution of the two. The first, second, and third sending units can separately execute corresponding sending tasks according to a communication protocol that they follow.

Details of functional implementations of the deployment apparatus shown in FIG. 6 can be referenced to the relevant descriptions above in conjunction with FIGS. 2-5, which are not repeated herein.

[Computing Device]

Figure 7:
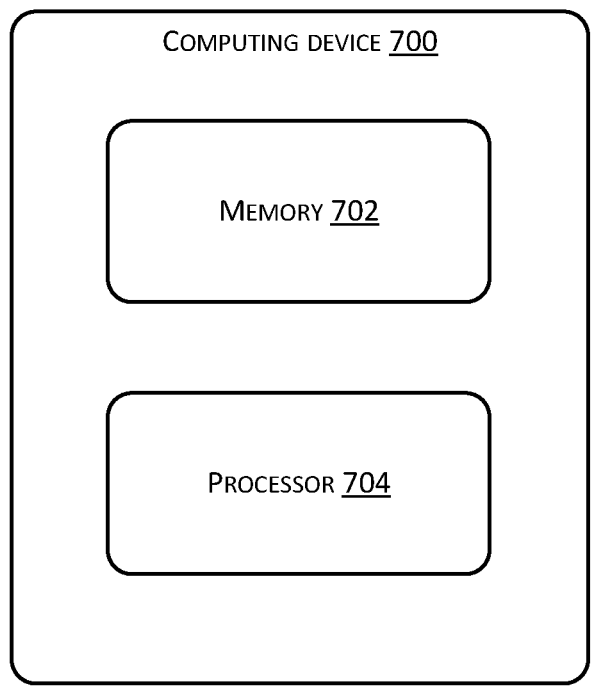
FIG. 7 shows a schematic structural diagram of a computing device that can be used to implement the above-mentioned methods for deploying a blockchain node service according to the embodiments of the present disclosure.

FIG. 7 shows a schematic structural diagram of a computing device 700 that can be used to implement the above-mentioned blockchain node service deployment methods according to the embodiments of the present disclosure.

Referring to FIG. 7, the computing device 700 includes a memory 702 and a processor 704.

The processor 704 may be a multi-core processor, or may include multiple processors. In implementations, the processor 704 may include a general-purpose main processor and one or more special co-processors, such as a graphics processing unit (GPU), a digital signal processor (DSP), etc. In implementations, the processor 704 may be implemented using a customized circuit, such as an Application Specific Integrated Circuit (ASIC) or a Field Programmable Gate Array (FPGA).

The memory 702 may include various types of storage units, such as a system memory, read-only memory (ROM), and a permanent storage device. The ROM may store static data or instructions required by the processor 704 or other modules of the computer. The non-volatile storage device may be a readable and writable storage device. The permanent storage device may be a non-volatile storage device that does not lose stored instructions and data even after the computer is powered off. In implementations, the permanent storage device adopts a large-capacity storage device (such as a magnetic or optical disk, flash memory) as the permanent storage device. In other embodiments, the permanent storage device may be a removable storage device (for example, a floppy disk, or an optical drive). The system memory can be a readable and writable storage device, or a volatile readable and writable storage device, such as dynamic random access memory. The system memory can store some or all of the instructions and data needed by the processor at runtime. In addition, the memory 702 may include any combination of computer-readable storage media, including various types of semiconductor memory chips (DRAM, SRAM, SDRAM, flash memory, programmable read-only memory), and magnetic disks and/or optical disks may also be used. In implementations, the memory 702 may include a removable storage device that can be read and/or written, such as a compact disc (CD), a read-only digital versatile disc (e.g., DVD-ROM, a dual-layer DVD-ROM), a read-only Blu-ray disc, an ultra-density disc, a flash memory card (such as a SD card, a min SD card, a micro-SD card, etc.), a magnetic floppy disk, etc. The computer-readable storage medium does not include carrier waves and instantaneous electronic signals transmitted through a wireless or wired means.

The memory 702 stores executable codes. When the executable codes are processed by the processor 704, the processor 704 can execute the blockchain node service deployment methods described above.

The methods, apparatuses and systems for deploying blockchain node services according to the present disclosure have been described in detail above with reference to the accompanying drawings.

In addition, the methods according to the present disclosure can also be implemented as a computer program or computer program product. Such computer program or computer program product includes computer program code instructions used for executing the above steps defined in the above methods of the present disclosure.

Alternatively, the present disclosure can also be implemented as a non-transitory machine-readable storage medium (or a computer-readable storage medium, or a machine-readable storage medium) on which executable codes (or computer programs, or computer instruction codes) are stored. When the executable codes (or computer programs, or computer instruction codes) are executed by a processor of an electronic device (or computing device, server, etc.), the processor is caused to execute various steps of the above method(s) according to the present disclosure.

One skilled in the art will also understand that the various types of exemplary logic blocks, modules, circuits, and algorithm steps described in conjunction with the disclosure herein can be implemented as electronic hardware, computer software, or a combination of both.

The flowcharts and block diagrams in the drawings show possible implementations of architecture, functions, and operations of the systems and methods according to multiple embodiments of the present disclosure. In this regard, each block in a flowchart or a block diagram may represent a module, a program segment, or a part of codes. The module, the program segment, or the part of the codes includes one or more executable instructions for realizing specified logical function(s). It should also be noted that in some alternative implementations, the functions marked in the blocks may also occur in an order different from those marked in the drawings. For example, two consecutive blocks can actually be executed in parallel, or can sometimes be executed in a reverse order, depending on the functions that are involved. It should also be noted that each block in a block diagram and/or a flowchart, and a combination of blocks in the block diagram and/or the flowchart, can be implemented by a dedicated hardware-based system that performs specified functions or operations, can be realized by a combination of dedicated hardware and computer instructions.

The embodiments of the present disclosure have been described above. The above description is exemplary, not exhaustive, and is not limited to the disclosed embodiments. Without departing from the scope and spirit of the described embodiments, a number of modifications and changes are apparent to one of ordinary skill in the art. The choice of terms used herein is intended to best explain the principles, practical applications, or improvements to the technology in the market for each embodiment, or to enable other ordinary skilled in the art to understand various embodiments disclosed herein.

The present disclosure can further be understood using the following clauses.

Clause 1: A blockchain node service deployment method, comprising: in response to a blockchain node service deployment request from a user, sending the deployment request to a blockchain server to enable the blockchain server to deploy a node service on one or more blockchain nodes; configuring a trusted application corresponding to the blockchain nodes for a device associated with the user based on configuration information of the one or more blockchain nodes that is returned by the blockchain server; and sending the trusted application to enable an installation of the trusted application on the device.

Clause 2: The method of Clause 1, wherein the configuration information comprises blockchain node address(es).

Clause 3: The method of Clause 1, wherein the blockchain node service deployment request comprises identification information of the device associated with the user and blockchain node configuration parameter(s).

Clause 4: The method of Clause 1, further comprising: receiving a service account registration request from the user and device information associated with the user; sending the service account registration request and the device information to a trusted service management server; and sending the service account registration request to the blockchain server.

Clause 5: The method of Clause 4, wherein sending the trusted application comprises: sending identification information of the device and the trusted application to the trusted service management server, to enable the trusted service management server to install the trusted application on the device.

Clause 6: The method of Clause 1, wherein the blockchain node service deployment method is applied to the Internet of Things, and the device is an Internet of Things device.

Clause 7: A blockchain node service deployment method, comprising: deploying a node service on one or more blockchain nodes in response to a blockchain node service deployment request from a user; configuring a trusted application corresponding to the blockchain nodes for a device associated with the user based on configuration information of the one or more blockchain nodes; and sending the trusted application to a trusted service management server to enable the trusted service management server to install the trusted application onto the device.

Clause 8: The method of Clause 7, wherein sending the trusted application comprises: sending identification information of the device and the trusted application to the trusted service management server, to enable the trusted service management server to install the trusted application onto the device.

Clause 9: The method of Clause 7, further comprising: receiving a service account registration request from the user and device information associated with the user to complete a service account registration of the user and binding of a related device; and sending the service account registration request and the device information to the trusted service management server.

Clause 10: The method of Clause 7, wherein the blockchain node service deployment method is applied to the Internet of Things, and the device is an Internet of Things device with a trusted security chip or module.

Clause 11: A blockchain node service deployment system, comprising: a blockchain management platform configured to respond to a blockchain node service deployment request from a user, send the deployment request to a blockchain server, configure a trusted application corresponding to the blockchain nodes for a device associated with the user based on configuration information of one or more blockchain nodes returned by the blockchain server, and send the trusted application to enable an installation of the trusted application on the device; and the blockchain server configured to respond to the deployment request from the blockchain management platform, deploy node services in the one or more blockchain nodes, and return the configuration information of the one or more blockchain nodes to the blockchain management platform.

Clause 12: The system of Clause 11, further comprising: a trusted service management server configured to remotely install the trusted application corresponding to the device on the device based on device identification information of the device associated with the user and the trusted application received from the blockchain management platform.

Clause 13: The system of Clause 12, further comprising: a trusted execution environment in the device, which is connected to the trusted service management server, and installs the trusted application corresponding to the device on the device in response to a remote installation operation from the trusted service management server.

Clause 14: The system of Clause 11, wherein the blockchain management platform is further configured to: receive a service account registration request from the user and device information associated with the user; send the service account registration request and the device information to the trusted service management server; and send the service account registration request to the blockchain server.

Clause 15: The system of Clause 14, wherein the blockchain management platform sends the identification information of the device and the trusted application to the trusted service management server, to enable the trusted service management server to install the trusted application on the device.

Clause 16: The system of Clause 11, wherein the blockchain node service deployment system is applied to the Internet of Things, and the device is an Internet of Things device with a trusted security chip or module.

Clause 17: A blockchain node service deployment apparatus, comprising: a request sending unit configured to send a blockchain node service deployment request to a blockchain server in response to the deployment request from a user, to enable the blockchain server to deploy node services on one or more blockchain nodes; an application configuration unit configured to configure a trusted application corresponding to the blockchain nodes for a device associated with the user based on configuration information of the one or more blockchain nodes that is returned by the blockchain server; and a first sending unit configured to send the trusted application to enable an installation of the trusted application on the device.

Clause 18: The apparatus of Clause 17, further comprising: a registration unit configured to receive a service account registration request and device information associated with the user from the user; and a second sending unit configured to send the service account registration request and the device information to a trusted service management server; and a third sending unit configured to send the service account registration request to the blockchain server.

Clause 19: The apparatus of Clause 17, wherein the first sending unit sends identification information of the device and the trusted application to the trusted service management server, to enable the trusted service management server to install the trusted application onto the device.

Clause 20: A computing device, comprising: a processor; and a memory storing executable codes, the executable codes when executed by the processor, causing the processor to perform the method of any one of Clauses 1-10.

Clause 21: A non-transitory machine-readable storage medium storing executable codes that, when executed by a processor of an electronic device, cause the processor to perform the method of any one of Clauses 1-10.

What is claimed is:

1. A method implemented by one or more processors, the method comprising:
   in response to a blockchain node service deployment request from a user, sending the blockchain node service deployment request to a blockchain server to enable the blockchain server to deploy a node service on one or more blockchain nodes;
   configuring a trusted application corresponding to the one or more blockchain nodes for a device associated with the user based on configuration information of the one or more blockchain nodes that is returned by the blockchain server; and sending the trusted application to enable an installation of the trusted application on the device.

2. The method of claim 1, wherein the configuration information comprises addresses of the one or more blockchain nodes.

3. The method of claim 1, wherein the blockchain node service deployment request comprises identification information of the device associated with the user and one or more blockchain node configuration parameters.

4. The method of claim 1, further comprising:
receiving a service account registration request from the user and device information associated with the user.

5. The method of claim 4, further comprising:
sending the service account registration request and the device information to a trusted service management server; and
sending the service account registration request to the blockchain server.

6. The method of claim 5, wherein sending the trusted application comprises:
sending identification information of the device and the trusted application to the trusted service management server, to enable the trusted service management server to install the trusted application on the device.

7. The method of claim 1, wherein the device comprises an Internet of Things device.

8. One or more computer readable media storing executable instructions that, when executed by one or more processors, cause the one or more processors to perform acts comprising:
deploying a node service on one or more blockchain nodes in response to a blockchain node service deployment request from a user;
configuring a trusted application corresponding to the one or more blockchain nodes for a device associated with the user based on configuration information of the one or more blockchain nodes; and
sending the trusted application to a trusted service management server to enable the trusted service management server to install the trusted application onto the device.

9. The one or more computer readable media of claim 8, wherein sending the trusted application comprises:
sending identification information of the device and the trusted application to the trusted service management server, to enable the trusted service management server to install the trusted application onto the device.

10. The one or more computer readable media of claim 8, the acts further comprising:
receiving a service account registration request from the user and information of the device associated with the user to complete a service account registration of the user and binding of the device.

11. The one or more computer readable media of claim 10, the acts further comprising:
sending the service account registration request and the information of the device to the trusted service management server.

12. The one or more computer readable media of claim 8, wherein the device comprises an Internet of Things device with a trusted security chip or module.

13. A system comprising:
one or more processors;
memory;
a blockchain management platform stored in the memory and executable by the one or more processors, and a blockchain server stored in the memory and executable by the one or more processors, wherein:
the blockchain management platform is configured to respond to a blockchain node service deployment request from a user, send the blockchain node service deployment request to the blockchain server, configure a trusted application corresponding to one or more blockchain nodes for a device associated with the user based on configuration information of the one or more blockchain nodes returned by the blockchain server, and send the trusted application to enable an installation of the trusted application on the device; and
the blockchain server is configured to respond to the blockchain node service deployment request from the blockchain management platform, deploy a node service in the one or more blockchain nodes, and return the configuration information of the one or more blockchain nodes to the blockchain management platform.

14. The system of claim 13, further comprising:
a trusted service management server configured to remotely install the trusted application corresponding to the device on the device based on identification information of the device associated with the user and the trusted application received from the blockchain management platform.

15. The system of claim 14, further comprising:
a trusted execution environment in the device, which is connected to the trusted service management server, configured to install the trusted application corresponding to the device on the device in response to a remote installation operation from the trusted service management server.

16. The system of claim 14, wherein the blockchain management platform is further configured to send the identification information of the device and the trusted application to the trusted service management server, to enable the trusted service management server to install the trusted application on the device.

17. The system of claim 13, wherein the blockchain management platform is further configured to:
receive a service account registration request from the user and information of the device associated with the user.

18. The system of claim 17, wherein the blockchain management platform is further configured to:
send the service account registration request and the information of the device to the trusted service management server.

19. The system of claim 18, wherein the blockchain management platform is further configured to:
send the service account registration request to the blockchain server.

20. The system of claim 13, wherein the system is applied to Internet of Things, and the device comprises an Internet of Things device with a trusted security chip or module.

* * * * *